United States Patent
Frost et al.

[19]

[11] Patent Number: 6,164,916
[45] Date of Patent: Dec. 26, 2000

[54] METHOD OF APPLYING WEAR-RESISTANT MATERIALS TO TURBINE BLADES, AND TURBINE BLADES HAVING WEAR-RESISTANT MATERIALS

[75] Inventors: Aaron Todd Frost, Ballston Spa, N.Y.; Andrew Jones, Jr., Greenville; Rosalia Marie Martinez-Brandon, Simpsonville, both of S.C.; Raymond Alan White, Schenectady, N.Y.

[73] Assignee: General Electric Company, Schenectady, N.Y.

[21] Appl. No.: 09/184,689

[22] Filed: Nov. 2, 1998

[51] Int. Cl.[7] .................................................. F01D 5/28
[52] U.S. Cl. ............................ 416/189; 416/190; 416/191; 416/241 R; 416/500; 148/528; 29/889.1; 29/889.7; 228/262.31
[58] Field of Search .................................... 416/189, 190, 416/191, 241 R, 500; 415/200; 29/889.1, 889.7, 527.2, 527.4, 527.6, 530, 557; 148/528, 525; 228/262.8, 248.1, 194, 175, 262.31

[56] References Cited

U.S. PATENT DOCUMENTS

| | | |
|---|---|---|
| 2,994,125 | 8/1961 | Hansel, Jr. . |
| 3,696,500 | 10/1972 | Tarshis et al. . |
| 4,034,454 | 7/1977 | Galasso et al. . |
| 4,291,448 | 9/1981 | Cretella et al. . |
| 4,624,860 | 11/1986 | Alber et al. . |
| 4,690,320 | 9/1987 | Morishita et al. . |
| 4,706,872 | 11/1987 | Norris . |
| 4,715,525 | 12/1987 | Norris . |
| 4,771,537 | 9/1988 | Pryor et al. . |
| 4,814,236 | 3/1989 | Qureshi et al. ........................ 428/678 |
| 4,883,219 | 11/1989 | Anderson et al. . |
| 4,961,529 | 10/1990 | Gottselig et al. . |
| 4,978,051 | 12/1990 | Tiearney, Jr. et al. . |
| 5,316,599 | 5/1994 | Ebato et al. . |
| 5,323,954 | 6/1994 | Shetty et al. . |
| 5,609,286 | 3/1997 | Anthon . |
| 5,660,320 | 8/1997 | Hoffmuller et al. ................. 227/122.1 |
| 5,704,538 | 1/1998 | Mittendorf . |
| 5,890,274 | 4/1999 | Clement et al. ........................ 427/456 |

FOREIGN PATENT DOCUMENTS

| | | |
|---|---|---|
| 0 287 371 | 10/1988 | European Pat. Off. . |
| 0 351 948 | 1/1990 | European Pat. Off. . |
| 0531252A | 12/1992 | European Pat. Off. . |
| 0 123 702 | 11/1984 | Germany . |
| 0 837 220 | 10/1996 | Germany . |
| 2135698A | 11/1983 | United Kingdom . |

OTHER PUBLICATIONS

"Development of a new flexible wear–resistant coating system", P.M. Roberts, W&MF, pp.**.

"Welding/Joining", Advanced Materials & Processes, Barrie Morgan, pp. 16.

"WideGap(tm)Braze Technology & Performs", MRI Product Bulletin No. 14.4.1 Subject: Joining Dissimilar Materials.

"SuperBraze(tm)Ceramic Joining in Air", MRI Product Bulletin No. 14.2.1.2 Subject: Joining of Ceramics and Metals.

(List continued on next page.)

*Primary Examiner*—Edward K. Look
*Assistant Examiner*—Liam McDowell
*Attorney, Agent, or Firm*—Ernest G. Cusick; Noreen C. Johnson

[57] ABSTRACT

A method of applying a wear-resistant hardface material (alloy) to a portion of a turbine blade, typically a wear surface on a shrouded turbine blade. A thin foil of brazing alloy (which in the preferred embodiment is a nickel-based alloy) is placed over said wear surface, and a hardface alloy of a greater than desired thickness (which in the preferred embodiment is a cobalt-based alloy) is placed thereover, thereby sandwiching the foil therebetween. The wear surface, foil, and hardface material are heated for a period sufficient to melt the foil and cause bonding of the hardface alloy to the wear surface. The hardface material is thereafter machined to bring the wear surface to design tolerances. A turbine blade, and a method of rebuilding a portion of a turbine blade, are also disclosed.

22 Claims, 3 Drawing Sheets

OTHER PUBLICATIONS

"SuperBraze(tm) Fluxless, Air Brazing of Metals", MRI Product Bulletin No. 14.2.1.1 Subject: Joining of Dissimilar Metals.

"Adapting Materials Technology for Industry", MRI brochure.

"BrazeCoat® Wear Cladding Material", MRI Product Bulletin No. 14.2.2.1Subject: Erosion and Abrasion Resistance.

"The Braze Coat–process Wear–resistant coatings close to the final contour built up by using organic–binder–bonded carbide and brazing preforms", Dr. Ing. Manfred Koschlig and Dr. Ing. Harld Krappitz, Haunau.

METHOD OF APPLYING WEAR-RESISTANT MATERIALS TO TURBINE BLADES, AND TURBINE BLADES HAVING WEAR-RESISTANT MATERIALS

BACKGROUND OF THE INVENTION

The present invention relates to application of wear-resistant material to a substrate by diffusion bonding, and more particularly to a method of brazing a wear resistant alloy to a turbine blade, and turbine blades having a wear-resistant alloy brazed thereto in accordance with the method.

Certain gas turbine blades have shrouds at the outer extremity of the airfoil. The blade shrouds are typically designed with an interlocking feature, usually in the form of a notch, which allows each blade to be interlocked at its shroud with an adjacent neighbor blade when such blades are installed about the circumference of a turbine disk. This interlocking feature assists in preventing the airfoils from vibrating, thereby reducing the stresses imparted on the blades during operation.

Unfortunately, turbine blades are typically made of nickel-based superalloys or other high temperature superalloys designed to retain high strength at high temperature, and the shroud material of the blade and the interlocking "notch" is not of a sufficient hardness to withstand wear stresses and rubbing which occur during start-up and shut-down of a turbine engine as the blades twist to an "interlocked" and "non-interlocked" position, respectively. Due to the relatively low Rockwell hardness of the shroud materials, the interlocks wear and cause gaps to open in the shrouds, thereby allowing the airfoils to twist and further deform, and even to possibly vibrate during operation which is extremely undesirable as such imparts additional higher stresses on the blades which can quickly lead to blade breakage and consequent failure of the turbine.

As a means of increasing the hardness of the blade shrouds at the interlock interface between adjacent blades, it is known to machine the shroud interlocks under-dimension and apply, by means of a flame-spray operation, a high hardness material, namely a chrome-carbide material to the interlock surface. The high hardness chrome-carbide material is applied using such flame spray operation to a thickness sufficient to bring the shroud interlock face up to the designed dimensional tolerances. Disadvantageously, however, the application of a harder material to the interlock area of the turbine blades (the so-called "Z-notch" area of the blade shroud) in the aforesaid manner produces a hardfacing that is porous, and has low bond adhesion to the nickel-based superalloy which the shroud is comprised of. The porosity makes it difficult to determine the exact dimensions of the thickness of the hardface material, thereby creating problems in interlocking due to the build-up of tolerances at the interlock interface around the periphery of a turbine disk. Moreover, the low adhesion causes the hardfacing to fall off during turbine operation thus re-introducing the original problem of worn, undersize interlocks and undesired stressing of non-interlocked blades.

As an alternative, welding of hardface material to the shroud is sometimes carried out. Again, in this method, the interlocks are machined under dimension, and the hardfacing of a greater-than-desired thickness is applied to the interlock 'Z-notch' by welding and thereafter machined so as to produce an interlock Z-notch of the desired dimensional tolerances. Undesirably, however, welding necessarily entails melting of both the hardfacing material and the shroud substrate, which causes an undesirable mixing of the two materials and not only a resultant diminution in the hardness of the hardfacing material but also a weakening of the superalloy characteristics of the shroud material substrate in the vicinity of the weld. Moreover, welding frequently causes cracking during manufacture due to the thermally induced stress gradients, and further often produces non-uniform hardness and porosity in the hardfacing material. Creation of cracks in highly-stressed materials is extremely undesirable. Accordingly, a need exists for a method to bond hardface materials to blades which is not porous and to which dimensional tolerances can easily be met, which has high bond strength suitable for bonding highly-stressed components.

SUMMARY OF THE INVENTION

In order to overcome the numerous disadvantages of the prior art methods for applying a hardface material to a turbine blade, in one of its broad aspects the present invention comprises a method whereby a hardface material is diffusion bonded to a turbine blade shroud.

Diffusion bonding, such as the method disclosed in U.S. Pat. No. 4,034,454 for materials such as zirconium, titanium, and their alloys, is known. Up until now, however, it was not thought appropriate to use such method for bonding materials to highly stressed components, such as turbine blades, in particular in the Z-notch location due to the perception of weakness of the bond and the resultant disastrous consequences if hardface material was to become dislodged. Advantageously and surprisingly, the present invention provides for a method for diffusion bonding a hardface material onto a shroud portion of a turbine blade, which not only overcomes the numerous disadvantages of prior art hardfacing, such as weld cracking, but also surprisingly provides a bond of substantial strength. In particular, it has further been discovered that a specific hardface material and two foil materials, each of a particular material composition, have been determined to create a diffusion bond of high bonding strength for this type of application.

Accordingly, and more particularly, in one of its broad aspects the present invention comprises a method of applying a wear-resistant hardface alloy to a portion of a turbine blade, comprising:

(i) placing a thin foil of a brazing alloy over a surface on the turbine blade to which it is desired to bond a hardface material;

(ii) positioning a hardface material over the foil, thereby sandwiching the foil between the turbine blade and the hardface material;

(iii) heating the turbine blade, foil, and hardface alloy so as to melt the brazing alloy and cause bonding of the hardface alloy to the turbine blade.

In a preferred embodiment, the hardface material and foil materials found to result in a sufficiently strong diffusion bond suited for this type of high-stress application (turbine blades) are, for the hardface material, a cobalt alloy consisting of Stellite 694 TM comprising (by weight %):

| | |
|---|---|
| Carbon | .70–1.0 |
| Cr | 26–30 |
| Si | 1.0 |
| Ni | 4–6 |
| Fe | 3.0 |
| Vanadium | 1.25 |
| B | .10 |
| W | 18–21 |
| Co | Balance. |

For the foil elements, two foils are found to be satisfactory, firstly, a nickel-based alloy known as Amdry 915, substantially comprising the following elements by weight %:

| | |
|---|---|
| Cr | 13 |
| Fe | 4 |
| Boron | 2.8 |
| Si | 4 |
| Ni | Balance | or secondly, a nickel-based superalloy substantially comprising the following elements, by weight %:

| | |
|---|---|
| Cr | 19 |
| Si | 7.3 |
| Boron | 1.5 |
| C | .08 |
| Ni | Balance. |

It is postulated that the boron in the foil materials acts as an eutectic depressant agent, which upon melting of the foil diffuses into both the hardface material and the shroud substrate, with the remaining foil then solidifying and forming a bond between the hardface material and the shroud substrate. It is thus preferred that the heating step in the method of the present invention occur for a time sufficient to allow diffusion of at least a portion of the boron in the foil away from an interface formed at the meeting of the shroud surface and foil, and into one or both of the hardface material and shroud material to effect proper diffusion bonding.

In a preferred embodiment the method of the present invention further comprises adding a powdered metallic alloy at a location intermediate the hardface alloy and turbine blade, and more particularly adding a bead of paste braze alloy over at least one exposed joint interface between the hardface material and the turbine blade prior to or coterminously with heating of the foil, to assist in the diffusion bonding. More particularly, in a preferred embodiment the powdered metallic alloy is a cobalt-based superalloy, substantially comprising AMS 4783, namely (by weight %):

| | |
|---|---|
| Ni | 17 |
| Cr | 19 |
| Tungsten | 4 |
| Carbon | .4 |
| Boron | .8 |
| Si | 8 |
| Co | Balance. |

The inventors have found that a powdered metallic alloy comprised of alloy A or alloy B, or comprised of two alloys A and B where A is a nickel-based superalloy comprising 60% (by weight) and B is a nickel-based superalloy comprising 40% (by weight) of such powdered metallic alloy, are suitable. In particular, alloy A substantially comprises (by weight %):

| | |
|---|---|
| Co | 10 |
| Cr | 8.3 |
| Al | 5.5 |
| Ti | 1.0 |
| Tantalum | 3.0 |
| Molybdenum | .7 |
| Tungsten | 10 |

-continued

| | |
|---|---|
| Hafnium | 1.5 |
| C | .14 |
| Boron | .015 |
| Ni | Balance | and alloy B substantially comprises (by weight %):

| | |
|---|---|
| Co | 22 |
| Cr | 15 |
| Boron | 2.8 |
| Si | 3.5 |
| Ni | Balance. |

It has been found that the mixture comprising 60% A/40%B is useful as a powdered metallic alloy which can be added in the above-explained manner to increase diffusion bonding and thus increase the strength of the bond between the hardface material and the turbine blade substrate.

Advantageously, the hardface diffusion bonding process of the present invention for applying a hardface material to a turbine blade, and in particular to a Z-notch surface in a shrouded turbine blade, overcomes the problems in the prior art methods. Unlike the prior art welding technique, wherein the hardface material was welded to the shroud and which resulted in localized melting of the hardface material and the shroud material in the vicinity of the weld, in the brazing technique of the present invention the heating process therein only results in heating of the hardface material, foil, and shroud to the melting point of the foil, which is typically much lower than the hardface material or the shroud material. Accordingly, no melting and blending of these latter materials occurs, thereby preserving the individual physical properties of the hardfacing component and the substrate, namely the hardness capabilities of the hardface material, and the high strength capabilities of the nickel-based superalloy material for the shroud, which is extremely critical for highly-stressed turbine blades. Moreover, because of the lower temperatures involved there is no (or significantly less) thermally-induced stress, and no induced cracking due to the localized heating and cooling of a weld.

In addition, in comparison with the known prior-art method of hardfacing by carbide deposition, the diffusion bonding of a hardface material by the method of the present invention possesses significant advantages thereover, namely that there is no resultant porosity of the hardface material, and further that the diffusion bonding is of sufficient strength to maintain the hardface material.

Turbine blades, either after manufacture or after prolonged use, can be subjected to heat treatments to restore the superalloy to its maximum strength. Advantageously, in another aspect of the present invention, it is discovered that the heating step of the present invention may be carried out over a time interval, wherein the heating simultaneously serves to permit not only the brazing and diffusion bonding of the hardface alloy to a portion of the turbine blade, but also serves to effect a heat treatment and/or stress relief of the turbine blade. The method of the present invention is particularly adapted and thus permits the diffusion bonding step to be carried out, if desired, at the same time as the heat treatment step, thereby economizing on manufacturing steps and avoiding having to conduct a separate heating for the diffusion bonding step of the present invention.

In a further preferred embodiment of the method of the present invention, to avoid oxidation and introduction of impurities into the turbine shroud and blade during the heating process, such heating is carried out in a non-oxidizing, inert, or vacuum atmosphere. In addition, to assist in the diffusion bonding process, the method of the present invention further contemplates that pressure may be applied to the hardface material during heating thereof, to assist in the diffusion bonding of the hardface material to the turbine shroud.

In a still further aspect of the present invention, a turbine blade is contemplated, when having a wear-resistant hardface alloy brazed to a portion thereof in accordance with the above method.

In yet a still further refinement of the present invention, the present invention has application for not only manufacture of new blades, but also in rebuilding surfaces of new or used blades. In such further aspect the invention comprises a method of rebuilding a portion of a turbine blade to manufacturing tolerances, comprising:

(i) grinding a portion of said turbine blade to form a ground mating surface;

(ii) placing a thin foil of brazing alloy over said mating surface;

(iii) positioning a hardface alloy over said foil, thereby sandwiching the foil between said mating surface and said hardface alloy;

(iv) heating said portion of said turbine blade, foil, and hardface alloy so as to melt said foil and cause in bonding of said hardface alloy to said portion of said turbine blade; and (v) machining said hardface material when bonded to said portion of said turbine blade so as to reduce said greater-than-desired thickness to a desired lesser thickness.

Such method of rebuilding a portion of a turbine blade is particularly useful in rebuilding worn interlock surfaces on a turbine blade shroud, which through operation have become worn. Advantageously, such method of rebuilding of turbine blades permits the interlock surfaces to be built up to original design tolerances thereby rendering previously unserviceable blades re-serviceable. The method of rebuilding blades in accordance with the present invention is likewise adapted to be carried out co-terminously with a heat treatment of the materials of the turbine blades to thereby rejuvenate the materials. In combining the two steps into one, economies in re-working used blades can be achieved.

BRIEF DESCRIPTION OF THE DRAWINGS

Further objects and advantages of the invention will be apparent from the following detailed description of the invention and the following drawings of preferred embodiments of the invention, in which.

DETAILED DESCRIPTION OF THE INVENTION

Figure 1:
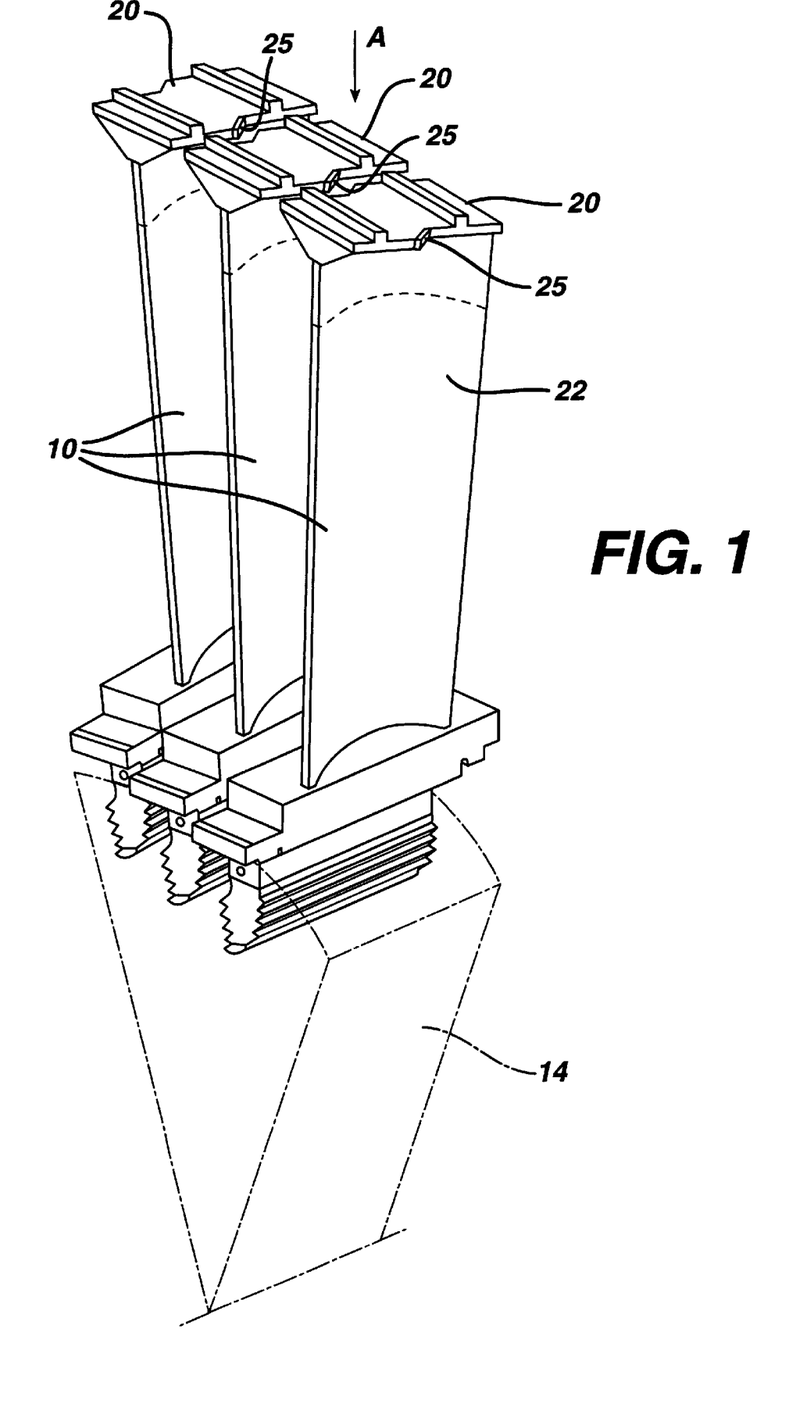
FIG. 1 is a perspective view of three turbine blades arranged in mutually-juxtaposed position as they would be when arranged about the periphery of a turbine disk, showing the turbine blade shroud and Z-notch interlock feature on the shroud adapted to lock the blades together at their outermost extremity when installed in a turbine disk, so as to prevent vibration of individual blades.
Figure 2:
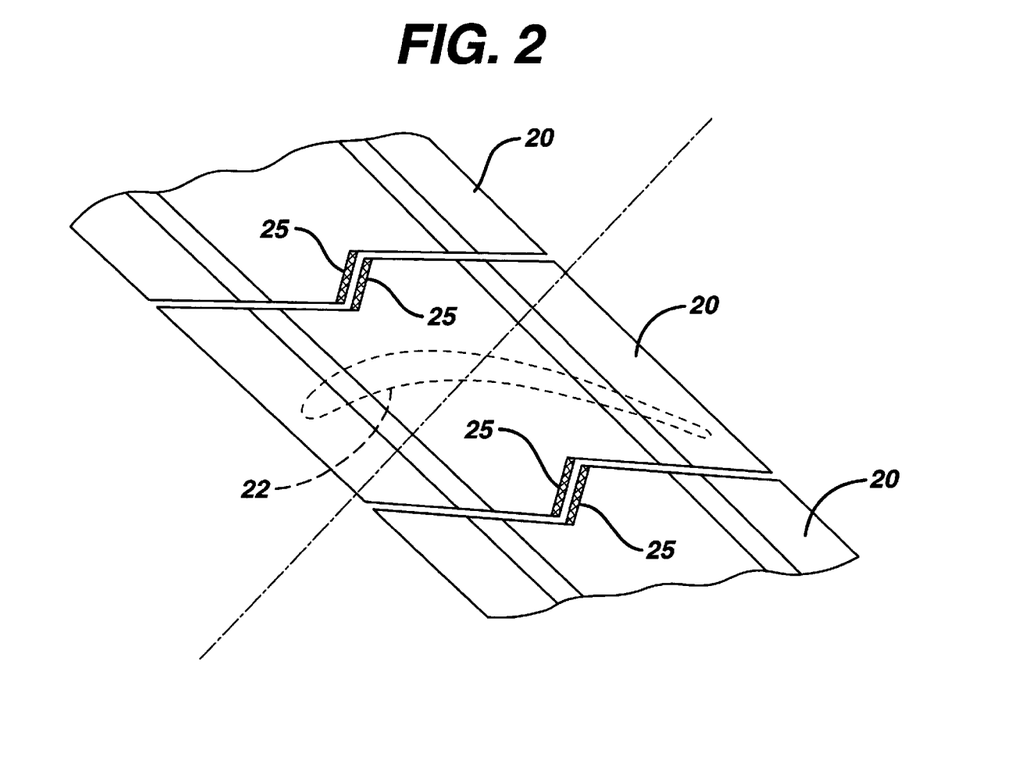
FIG. 2 is a view on arrow 'A' of FIG. 1, showing the Z-notch interlock feature in greater detail, and also showing the location of the hardface material which is bonded to the shroud in accordance with the present invention.

As may be seen from FIG. 1 (perspective view) and FIG. 2 (top view), depicted therein are a plurality of turbine blades 10 installed about the radial periphery of a portion of a turbine disk 14, each blade 10 having a corresponding shroud 20 at the outermost extremity of the airfoil 22 thereof. Each shroud 20 has two correspondingly-opposite Z-notches 25. Each Z-notch 25 has a hardface material (alloy) 28 bonded thereto, in accordance with the method of the invention as will hereinafter be described in detail.

The hardface material 28 of each blade 10 is adapted to come into contact with a corresponding hardface material 28 with a corresponding Z-notch 25 of a neighboring turbine blade 10 when the turbine disk 14 is spun at operating speeds. The hardface material 28 bonded to the respective Z-notches 25 protects each notch 25 within each shroud 10 from wear arising from frictional contact during operation when the blades 10 are under centrifugal, pressure, thermal, and vibratory loading.

A preferred embodiment of the method of the present invention for applying a hardface material 28 to a Z-notch 25 of a turbine blade 10 will now be described. Reference is made to the Z-notch 25 of a shroud 20 of a turbine blade 10 show in FIG. 3.

Figure 3:
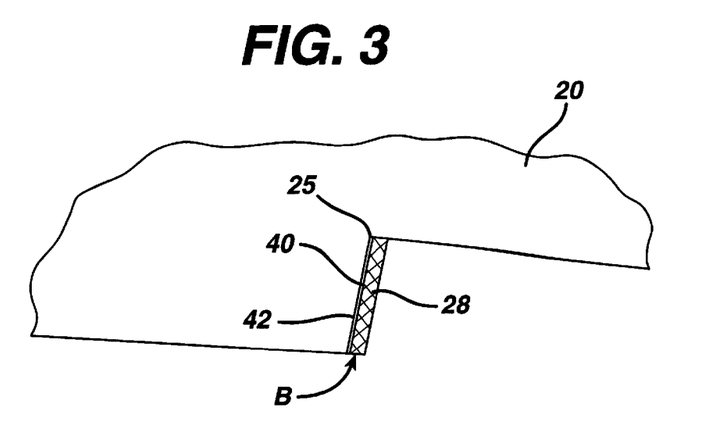
FIG. 3 is an enlarged view of the hardfacing material brazed to the notch in the turbine blade shown in FIG. 2.

A thin foil 40 of approximately 1 mm to 5 mm or greater is first cut in substantially the shape and area of an intended mating face 42 of a Z-notch 25 of the shroud 10 to which the hardfacing material 28 is intended to be applied. The mating face 42 is typically a substantially flat surface which lies in a substantially vertical plane. Such face 42 may be an originally cast surface, or may be (and preferably is) machined to such configuration by a conventional milling or grinding process. The mating face 42 may optionally be nickel-blasted to roughen the surface 42 to assist in the diffusion bonding. Nickel is chosen for this purpose so as not to introduce any impurities into the nickel-based superalloy of which the shroud 20 is typically comprised.

Thereafter, the thin foil 40 is placed over the mating face 42 of the shroud 20 of the turbine blade 10. Advantageously, the foil 40, being generally cut to or covering the surface area of the mating surface 42, better ensures brazing alloy will be present over the entire interface which exists between the hardface material 28 and the mating face 42. This is not necessarily always the case if a paste bead of metal is only used and capillary action is relied on. As described below, however, a paste bead of metal alloy may also be used to fill in any interstitial gaps, but it is recognized as a definite advantage of this process that the foil preform 40, being firstly cut to size or at least covering the desired mating face surface 42, ensures that braze alloy will be present at all locations at the mating face 42.

The hardface material 28 (hereinafter the hardface preform 28) having dimensions substantially corresponding to those of the mating face 42 and of a thickness somewhat greater than eventually desired, is placed over the foil 40 so as to sandwich the foil preform 40 between the mating face 42 and the hardface preform 28. Such hardface preform 28 may be pressed against the foil 40 and held thereagainst during the heating step (described below). Alternatively, the hardface preform 28 may be lightly tack welded. In such embodiment a weld rod tip (not shown) is applied to the exterior surface of the hardface preform 28, and the hardface material 28 is tack welded at one or two discrete locations through the hardface material 28 to the mating face 42 to maintain the hardface preform 28 in a position sandwiching the foil 40 between the hardfacing 28 and the mating face 42. The thickness of the hardface preform 28 is typically 0.080–0.100" thick. Accordingly, the weld torch should be powerful enough to tack weld through the hardface preforms 28, but not sufficiently powerful to cause anything more than minor localized melting at one or two discreet locations sufficient to tack the hardface 28 to the shroud 20.

Due to the mating surface 42 having an irregular surface, gaps may exist around the edges of the hardface preform 28 and the mating surface 42. An edge alloy (not shown) in the form of a paste bead of metal alloy, may be applied at location B (see FIG. 3) to fill in any gaps at the interface between the hardface material 28 and the mating surface 42, to ensure that the braze alloy which comprises the foil 40 will, upon heating (described below), melt at such locations and contact both the hardface material and the shroud 20.

Once the foil 40 is sandwiched between the hardface preform 28 and mating surface 42, heat is applied to the assembly at a temperature sufficient so as to cause the foil preform 40 to melt and for a time period sufficient to cause diffusion bonding of the hardface alloy to the shroud. The actual melting temperature depends on the composition of the foil 40 used, but typically for foils containing nickel-based alloys having boron or an equivalent added as a eutectic depressant the melting point is in the range of about 900 F. This melting temperature is typically far less than the melting point of the hardface material 28 or the shroud 20, the latter typically comprising a nickel-based superalloy and having a melting point in excess of 2175 F. The time period to cause sufficient diffusion bonding is generally in the range of about 45 minutes at a temperature between 800–900 F, although longer periods are recommended.

Due to the extreme undesirability of introducing any impurities into the metals during the heating process, the heating process is carried out in a non-oxidizing atmosphere, generally under a vacuum or in the presence of an inert gas.

Figure 4:
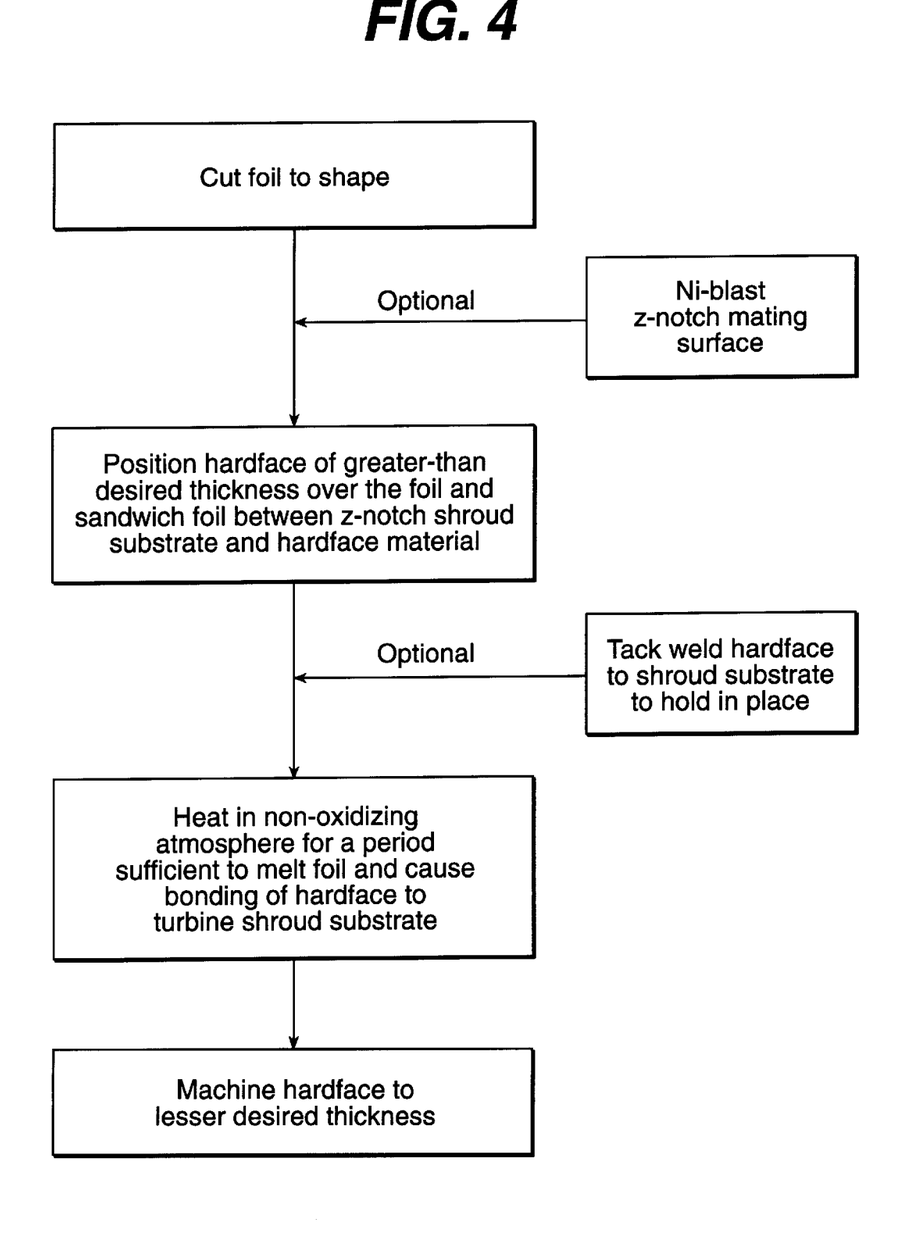
FIG. 4 is a schematic flow chart broadly depicting the method of the present invention.

As a last step of the method of the present invention, after cooling the hardface preform 28 is machined to reduce the greater-than-desired thickness to a less desired thickness to allow the Z-notch 25 of the various blades 10 to possess dimensions consistent with design tolerances. FIG. 4 shows a schematic of the method of the present invention as described above.

In a preferred embodiment of the method of the present invention, the diffusion bonding may take place simultaneously with a heat treatment being applied to the blades for the purpose of stress relief and material rejuvenation. The temperatures and times for stress relief are typically well in excess of the temperatures and times to effect diffusion bonding of the hardface preform material 28 to the shroud 20. Accordingly, the diffusion bonding process of the present invention may be carried out as part of the blade rejuvenation process. This ability to combine the two steps is particularly useful where used blades 10, having worn Z-notch areas 25, are desired to be rebuilt in such area up to original material tolerances by having a new hardface material 28 applied thereto. The heating step used as part of the present invention for diffusion bonding becomes a subset of the blade heat treatment used for blade stress relief and blade rejuvenation.

In a preferred embodiment, where the foil 40 contains boron used as an eutectic depressant agent, the sandwiched assembly of hardface preform 28, foil 40, and Z-notch substrate 25 is heated for a period to allow diffusion of boron from within the foil 40, thereby resulting in solidification of the eutectic melted foil and bonding of the hardface to the shroud substrate upon solidification of the foil alloy.

EXAMPLE 1

A first series of tests were conducted to assess the ability of the method of the present invention to successfully bond a hardface preform 28 to a Z-notch 25 in a shroud 20 of a turbine blade 10, using certain selected materials for the shroud 20, foil 40, hardface preform 28, and edge alloy, as part of a blade heat treatment.

The shroud material 20 selected for this series of tests (and also Example 2 below) was a General Electric proprietary material, specifically a GTD 111 nickel-based superalloy.

The hardface preform material 28 selected for the first test was a cobalt-based hardface alloy produced by Deloral Stellite Inc., under the trade name Tribaloy T800. Such hardface alloy is comprised of, by weight %:

| | |
|---|---|
| Co | 51.0–53.0 |
| Cr | 16.5–17.5 |
| Si | 3.0–3.5 |
| Fe + Ni | 3.0 Max |
| Mo | 27–29 |
| S | .03 Max |
| P | .03 Max |
| C | .1% Max. |

Two types of foil 40 were tested, a first commercially available nickel-based alloy, (designated foil A), known as Amdry 915, comprising, by weight %:

| | |
|---|---|
| Cr | 13 |
| Fe | 4 |
| Boron | 2.8 |
| Silicon | 4 |
| Ni | Balance. |

A second foil (designated foil B), likewise a commercially available nickel-based alloy, comprising, by weight %:

| | |
|---|---|
| Cr | 13 |
| Boron | 1.5 |
| Silicon | 7.3 |
| C | .08 |
| Ni | Balance. |

Likewise, two types of edge alloy were tested, a first paste bead of a cobalt-based metal alloy comprised of AMS 4783, which comprises, by weight %:

| | |
|---|---|
| Ni | 17 |
| Cr | 19 |
| Tungsten | 4 |
| Carbon | .4 |
| Boron | .8 |
| Silicon | 8 |
| Co | Balance. |

A second edge alloy was used, likewise in the form of a bead paste of metal alloy, comprised 60% of alloy A, alloy A comprising, by weight %:

| | |
|---|---|
| Co | 10 |
| Cr | 8.3 |
| Al | 5.5 |
| Titanium | 1.0 |
| Tantatum | 3.0 |
| Molybdenum | .70 |
| Hafnium | 1.5 |
| Carbon | .14 |
| Boron | .015 |
| Ni | Balance. |

To proceed with the test, sixteen lap shear specimens were first prepared, each comprising an elongate rectangular member of width and thickness dimensions 0.500"±0.005" and 0.125"±0.005", respectively. Two identical half specimens were prepared of the above width and thickness, the first half comprised of the GTD 111 shroud substrate material, and the other of the hardface material Triballoy T800. The two halves were then overlapped at their corresponding ends for a distance of ³⁄₁₆", and a foil interposed between the two halves, such foil being either foil 'A' or foil 'B' as identified above. An edge alloy, of either AMS 4783, or 60% Alloy A/40% Alloy B (page 6), was applied at the exterior interface around the periphery of the overlap. A pre-braze cleaning prep, comprising a nickel blast on each of the two halves in the area of the overlap, was carried out on eight of the sixteen specimens.

Heat was then applied in accordance with one of either two cyclic heat treatments to braze the materials together. In particular, eight of the tensile specimens were subject to the following cyclic heating, namely:

| | |
|---|---|
| Cycle 1 | 900 F/45 min + 1950 F/30 min + 2175 F/20 min + 2050 F/120 min + 2100 F/12 min |

The eight remaining specimens were given the following heating:

| | |
|---|---|
| Cycle 2 | 900 F/45 min + 1950 F/30 min + 2175 F/60 min + 2050 F/60 min |

Both heating cycles were carried out in a vacuum ($5 \times 10^{-4}$ torr), and the joined lap-shear specimen subsequently argon cooled to less than 200 F.

Thereafter, tensile stress tests were performed on the sixteen shear specimens prepared as set out above. The results are shown in Table I below.

TABLE I

| Edge Alloy | Foil | Cycle | Ni-Blast | Strength (psi) |
|---|---|---|---|---|
| AMS 4783 | A | 1 | Yes | 18,864 |
| AMS 4783 | A | 1 | Yes | 14,768 |
| AMS 4783 | B | 1 | Yes | 19,1936 |
| AMS 4783 | B | 1 | Yes | 16,672 |
| AMS 4783 | A | 1 | No | 18,272 |
| AMS 4783 | A | 1 | No | 17,728 |
| AMS 4783 | B | 1 | No | mis-test |
| AMS 4783 | B | 1 | No | mis-test |
| AMS 4783 | A | 1 | Yes | 21,712 |
| 60% Alloy A/<br>40% Alloy B | A | 2 | Yes | 22,576 |

TABLE I-continued

| Edge Alloy | Foil | Cycle | Ni-Blast | Strength (psi) |
|---|---|---|---|---|
| 60% Alloy A/<br>40% Alloy B | B | 2 | Yes | 19,056 |
| 60% Alloy A/<br>40% Alloy B | B | 2 | Yes | 20,592 |
| 60% Alloy A/<br>40% Alloy B | A | 2 | Yes | 15,984 |
| 60% Alloy A/<br>40% Alloy B | A | 2 | No | 16,016 |
| 60% Alloy A/<br>40% Alloy B | B | 2 | No | 21,296 |
| 60% Alloy A/<br>40% Alloy B | B | 2 | No | 21,680 |

Failure of all specimens was in the hardface material of the lap-shear tensile specimen, and not at the joint overlap or in the GTD111 material.

In addition, prior to tensile testing of the sixteen specimens, the hardface side of eight of the sixteen specimens was Rockwell-c hardness tested at the area of the overlap.

The results of such hardness testing are set out below:

TABLE II

| Hardface Alloy | Edge Alloy | Foil | Cycle | Ni Blast | Rc 1 | Rc 2 | Rc 3 |
|---|---|---|---|---|---|---|---|
| T800 | AMS 4783 | A | 1 | Yes | 54.0 | 53.8 | 54.8 |
| T800 | AMS 4783 | B | 1 | Yes | 53.9 | 55.6 | 55.2 |
| T800 | AMS 4783 | A | 1 | No | 52.9 | 54.8 | 53.8 |
| T800 | AMS 4783 | B | 1 | No | 53.9 | 54.1 | 53.7 |
| T800 | 60% Alloy A/<br>40% Alloy B | A | 2 | Yes | 54.2 | 54.3 | 53.4 |
| T800 | 60% Alloy A/<br>40% Alloy B | B | 2 | Yes | 54.2 | 55.2 | 55.0 |
| T800 | 60% Alloy A/<br>40% Alloy B | A | 2 | No | 53.7 | 54.2 | 55.0 |
| T800 | 60% Alloy A/<br>40% Alloy B | B | 2 | No | 52.3 | 55.0 | 54.8 |

EXAMPLE 2

A further sixteen specimens were prepared identical to those prepared in Example 1, save and except that Stellite 694 was substituted for T800 as the hardface material 28, and tensile tests performed as above. The results of these tests are set out below:

TABLE III

| Edge Alloy | Foil | Cycle | Ni-Blast | Strength (psi) |
|---|---|---|---|---|
| AMS 4783 | A | 1 | Yes | 38,160 |
| AMS 4783 | A | 1 | Yes | 31,648 |
| AMS 4783 | B | 1 | Yes | 31,648 |
| AMS 4783 | B | 1 | Yes | 43,200 |
| AMS 4783 | A | 1 | No | 36,128 |
| AMS 4783 | A | 1 | No | 32,848 |
| AMS 4783 | B | 1 | No | 38,352 |
| AMS 4783 | B | 1 | No | 40,000 |
| 60% Alloy A/<br>40% Alloy B | A | 2 | Yes | 37,424 |
| 60% Alloy A/<br>40% Alloy B | A | 2 | Yes | 32,624 |
| 60% Alloy A/<br>40% Alloy B | B | 2 | Yes | 40,624 |
| 60% Alloy A/<br>40% Alloy B | B | 2 | Yes | 34,064 |
| 60% Alloy A/ | A | 2 | No | 40,192 |

TABLE III-continued

| Edge Alloy | Foil | Cycle | Ni-Blast | Strength (psi) |
|---|---|---|---|---|
| 40% Alloy B | | | | |
| 60% Alloy A/ | A | 2 | No | 41,952 |
| 40% Alloy B | | | | |
| 60% Alloy A/ | B | 2 | No | 32,576 |
| 40% Alloy B | | | | |
| 60% Alloy A/ | B | 2 | No | 38,048 |
| 40% Alloy B | | | | |

Failure of all specimens in Example 2 was similarly in the hardface material of the lap shear specimens, and not at the joint overlap or in the GTD111 material.

In addition, a similar Rockwell hardness test was performed in three separate locations on eight of the sixteen samples, in the area of the overlap, as was performed in the case of Example 1.

TABLE IV

| Edge Alloy | Foil | Cycle | Ni Blast | Rc-1 | Rc-2 | Rc-3 |
|---|---|---|---|---|---|---|
| AMS 4783 | A | 1 | Yes | 45.3 | 46.2 | 45.8 |
| AMS 4783 | B | 1 | Yes | 46.8 | 46.9 | 47.1 |
| AMS 4783 | A | 1 | No | 43.8 | 47.2 | 44.9 |
| AMS 4783 | B | 1 | No | 45.7 | 46.1 | 46.9 |
| 60% Alloy A/ | A | 2 | Yes | 45.1 | 45.8 | 46.0 |
| 40% Alloy B | | | | | | |
| 60% Alloy A/ | B | 2 | Yes | 48.2 | 49.2 | 48.7 |
| 40% Alloy B | | | | | | |
| 60% Alloy A | A | 2 | No | 47.4 | 48.2 | 47.7 |
| 40% Alloy B | | | | | | |
| 60% Alloy A | B | 2 | No | 48.9 | 48.8 | 49.2 |
| 40% Alloy B | | | | | | |

Examination of the above tests and data Tables I through IV shows that using cyclic heating (in the range and of a duration which is for stress-relieving turbine blades) as a means of diffusion bonding a hardface material 28 to a turbine blade material (GTD111) produces a bond having high tensile stress. In addition, due to the failure in all cases occurring in the hardface material, rather than at the joint or in the GTD111 material, such shows that there has been immeasurable or no depreciable deterioration due to the bonding in the tensile characteristics of the shroud substrate material GTD111. This means no substantial material degradation occurred due to any mixing of the hardness alloy with the shroud substrate in the area of the bond. This is further confirmed that no material degradation of the hardfacing has occurred, as the Rockwell hardness has remained high as well as substantially uniform (Ref. Tables II and IV).

Although the disclosure describes and illustrates the preferred embodiments of the invention, it is understood that the invention is not limited to these particular embodiments. Many variations and modifications will now occur to those skilled in the art. For a definition of the invention, reference is made to the appended claims.

We claim:

1. A method of applying a wear-resistant hardface alloy to a portion of a turbine blade, comprising:

placing a thin foil of a brazing alloy over a mating surface of said portion of said turbine blade;

positioning a hardface alloy of a greater-than-desired thickness over said foil, thereby sandwiching the foil between said portion of said turbine blade and said hardface alloy;

heating said portion of said turbine blade, foil, and hardface alloy for a period sufficient to melt said foil and cause bonding of said hardface alloy to said portion of said turbine blade; and thereafter machining said hardface alloy so as to reduce said greater-than-desired thickness to a desired lesser thickness.

2. The method as claimed in claim 1, wherein said hardface alloy is comprised of a cobalt-based alloy substantially consisting of the following elements, by percent weight:

| | |
|---|---|
| Carbon | .70–1.0 |
| Cr | 26–30 |
| Si | 1.0 |
| Ni | 4–6 |
| Fe | 3.0 |
| Vn | .75–1.25 |
| B | .005–.10 |
| W | 18–21 |
| Co | Balance |

3. The method as claimed in claim 2, wherein said foil is comprised of a nickel-based alloy substantially consisting of the following elements, by percent weight, namely:

| | |
|---|---|
| Cr | 13 |
| Fe | 4 |
| Boron | 2.8 |
| Si | 4. |
| Ni | Balance |

4. The method as claimed in claim 2, wherein said foil is comprised of a nickel-based alloy substantially consisting of the following elements, by percent weight, namely:

| | |
|---|---|
| Cr | 19 |
| Boron | 1.5 |
| Carbon | .08 |
| Si | 7.3 |
| Ni | Balance |

5. The method of claim 1, further comprising adding a powdered metallic alloy in a location intermediate said hardface alloy and said portion of said turbine blade.

6. The method as claimed in claim 5, wherein said step of adding a powdered metallic alloy comprises adding a bead of paste braze alloy over at least one exposed joint interface between said hardface alloy and said portion of said turbine blade prior to heating.

7. The method as claimed in claim 5, wherein said powdered metallic alloy is a nickel-based alloy substantially consisting of the following elements, by percent weight, namely:

| | |
|---|---|
| Co | 10 |
| Cr | 8.3 |
| Al | 5.5 |
| Ti | 1.0 |
| Tantalum | 3.0 |
| Molybdenum | .7 |
| Tungsten | 10 |
| Hafnium | 1.5 |
| Carbon | .14 |
| Boron | .015 |
| Ni | Balance |

8. The method as claimed in claim 5, wherein said powdered metallic alloy is a nickel-based alloy substantially consisting of the following elements, by percent weight, namely:

| | |
|---|---|
| Co | 22 |
| Cr | 15 |
| Boron | 2.8 |
| Silicon | 3.5 |
| Ni | Balance |

9. The method as claimed in claim 5, wherein said powdered metallic alloy is a nickel-based alloy, comprised of 60% (by weight) of the alloy claimed in claim 7 and 40% (by weight) of the alloy claimed in claim 8.

10. The method as claimed in claim 5, wherein said powdered metallic alloy substantially comprises by weight %:

| | |
|---|---|
| Ni | 17 |
| Cr | 19 |
| Tungsten | 4 |
| Carbon | .4 |
| Boron | .8 |
| Silicon | 8 |
| Co | Balance. |

11. The method as claimed in claim 1, further comprising the step, after positioning the hardface alloy over said foil, of tack-welding the hardface alloy one or more localized positions to said portion of the turbine blade, thereby temporarily holding the foil in sandwiched position between said hardface alloy and said portion of said turbine blade.

12. The method as claimed in claim 1, in which the foil is of a thickness within a range of 1 to 5 mm.

13. The method as claimed in claim 1, wherein said heating is carried out in a non-oxidizing atmosphere.

14. The method as claimed in claim 3 or 4, wherein said heating is applied over a time interval sufficient to diffuse at least a portion of the boron in said foil away from an interface formed at said mating surface and said hardface alloy.

15. The method as claimed in claim 1, wherein said heating additionally serves as at least a partial heat treatment for the turbine blade so as to permit simultaneous adhesion of said hardface alloy to said portion of said turbine blade and a partial heat treatment of the turbine blade.

16. The method as claimed in claim 1, wherein said portion of said turbine blade comprises a flat surface on a shroud of a shrouded turbine blade, adapted for contact with a corresponding surface on an adjacent turbine blade.

17. The method as claimed in claim 1, further comprising the step of applying pressure to the hardface alloy while heating.

18. A turbine blade having a wear resistant hardface alloy brazed to a portion thereof by the method as claimed in claim 1.

19. A turbine blade having a shroud and having a notch in said shroud, said notch having a wear resistant hardface alloy applied thereto in accordance with the method according to claim 1.

20. A method of rebuilding a portion of a turbine blade to manufacturing tolerances, comprising:

grinding a portion of said turbine blade to form a ground mating surface;

placing a thin foil of brazing alloy over said mating surface;

positioning a hardface material over said foil, thereby sandwiching the foil between said mating surface and said hardface material;

heating said portion of said turbine blade, foil, and hardface alloy so as to melt said brazing alloy and cause bonding of said hardface material to said portion of said turbine blade; and machining said hardface material when bonded to said portion of said turbine blade so as to reduce said greater-than-desired thickness to a desired lesser thickness.

21. The method of rebuilding a portion of a turbine blade to manufacturing tolerances as claimed in claim 20, wherein said heating is applied over a time interval.

22. The method of rebuilding a portion of a turbine blade as claimed in claim 20, wherein such heating is carried out as part of a heat treatment of the turbine blade.

* * * * *